United States Patent
Wang et al.

(10) Patent No.: US 12,039,268 B2
(45) Date of Patent: Jul. 16, 2024

(54) GRAPH-BASED NATURAL LANGUAGE OPTIMIZATION METHOD AND ELECTRONIC APPARATUS

(71) Applicant: Industrial Technology Research Institute, Hsinchu (TW)

(72) Inventors: Chieh-Jen Wang, Hsinchu (TW); Chung-Jen Chiu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 290 days.

(21) Appl. No.: 17/549,873

(22) Filed: Dec. 14, 2021

(65) Prior Publication Data

US 2023/0135579 A1 May 4, 2023

(30) Foreign Application Priority Data

Oct. 29, 2021  (TW) .................................. 110140297

(51) Int. Cl.
*G06F 17/00* (2019.01)
*G06F 16/28* (2019.01)
*G06F 16/901* (2019.01)
*G06F 40/166* (2020.01)
*G06F 40/205* (2020.01)
(Continued)

(52) U.S. Cl.
CPC .......... *G06F 40/279* (2020.01); *G06F 16/288* (2019.01); *G06F 16/9024* (2019.01); *G06F 40/166* (2020.01); *G06F 40/205* (2020.01); *G06F 40/40* (2020.01)

(58) Field of Classification Search
None
See application file for complete search history.

(56) References Cited

U.S. PATENT DOCUMENTS

| | | | |
|---|---|---|---|
| 9,864,738 B2 | 1/2018 | Mengle et al. | |
| 10,366,343 B1* | 7/2019 | Zappella | G06F 16/9024 |
| 10,387,437 B2 | 8/2019 | Nowak-Przygodzki et al. | |

(Continued)

FOREIGN PATENT DOCUMENTS

| | | |
|---|---|---|
| CN | 101352826 | 1/2011 |
| CN | 103678281 | 3/2014 |

(Continued)

OTHER PUBLICATIONS

Zhiyu Chen et al., "Few-Shot NLG with Pre-Trained Language Model", rearXiv: 1904.09521v3 [cs.CL] Apr. 19, 2020, pp. 1-8.
(Continued)

*Primary Examiner* — Satwant K Singh
(74) *Attorney, Agent, or Firm* — JCIPRNET

(57) ABSTRACT

A graph-based natural language optimization method and an electronic apparatus are provided. The method is adapted for an electronic apparatus with a processor. In the method, an input sentence submitted by a user is received, and multiple domain-related entities are extracted from the input sentence. The domain-related entities are input to a graph database to analyze a connection relationship between the domain-related entities, and filling data is obtained from the graph database based on the connection relationship. The input sentence and the filling data are integrated via a natural language processing technology to generate an optimized natural language sentence.

14 Claims, 3 Drawing Sheets

(51) Int. Cl.
*G06F 40/279* (2020.01)
*G06F 40/40* (2020.01)

(56) References Cited

U.S. PATENT DOCUMENTS

| | | | |
|---|---|---|---|
| 10,896,222 B1 * | 1/2021 | Christodoulopoulos | ................... G06F 40/30 |
| 2018/0341863 A1 * | 11/2018 | Ding | ................ G06N 3/084 |
| 2019/0197176 A1 * | 6/2019 | Luo | ................ G06F 16/9536 |
| 2021/0012217 A1 | 1/2021 | Croutwater et al. | |
| 2021/0192364 A1 | 6/2021 | Wang et al. | |
| 2022/0129447 A1 * | 4/2022 | Wang | ................ G06Q 50/04 |
| 2022/0164683 A1 * | 5/2022 | Hao | ................ G06F 16/35 |

FOREIGN PATENT DOCUMENTS

| | | |
|---|---|---|
| CN | 107423820 | 12/2017 |
| CN | 105772946 | 1/2018 |
| CN | 109614501 | 4/2019 |
| CN | 110209787 | 9/2019 |
| CN | 110457661 | 11/2019 |
| CN | 111026046 | 4/2020 |
| CN | 111339246 | 6/2020 |
| CN | 111831794 | 10/2020 |
| CN | 113312919 | 8/2021 |
| TW | 201807602 | 3/2018 |
| TW | I645357 | 12/2018 |
| TW | I682286 | 1/2020 |
| TW | M598440 | 7/2020 |

OTHER PUBLICATIONS

Wenhu Chen et al., "Logical Natural Language Generation from Open-Domain Tables", arXiv:2004.10404v2 [cs.CL] Apr. 28, 2020, pp. 1-14.
"Office Action of Taiwan Counterpart Application", issued on Oct. 16, 2023, p. 1-p. 9.
"Office Action of Taiwan Counterpart Application", issued on Aug. 3, 2022, p. 1-p. 15.
"Office Action of Taiwan Counterpart Application", issued on Feb. 29, 2024, p. 1-p. 10.

* cited by examiner

GRAPH-BASED NATURAL LANGUAGE OPTIMIZATION METHOD AND ELECTRONIC APPARATUS

CROSS-REFERENCE TO RELATED APPLICATION

This application claims the priority benefit of Taiwanese application no. 110140297, filed on Oct. 29, 2021. The entirety of the above-mentioned patent application is hereby incorporated by reference herein and made a part of this specification.

TECHNICAL FIELD

The technical field relates to a graph-based natural language optimization method and an electronic apparatus.

BACKGROUND

Natural language processing (NLP) is a technology for various automated processing of human language in fields of artificial intelligence and linguistics for allowing computers to analyze, understand, and synthesize human language. Natural language processing covers a wide range of topics, including word segmentation, syntactic analysis, semantic inference, machine translation, speech recognition, speech synthesis, language generation, and other technologies.

Generally speaking, a manufacturer often writes an operating manual to teach users how to operate systems, machines, products or how to perform experimental steps. The operating manual refers to, for example, a teaching manual, a user manual, a training manual, or the like. However, operating instructions in a traditional operating manual often include many information gaps. For example, an operating manual of a machine usually lacks information such as component names, operating methods, operating positions, or specification conditions. The information gaps greatly increase cognitive load of users in understanding operating instructions, thus leading to operating errors likely to occur due to cognitive errors by users during operation in accordance with the operating instructions in the operating manual. Therefore, how to fill an information gap in a sentence is currently one of the research topics in the natural language optimization technology.

SUMMARY

One of exemplary embodiments provides a graph-based natural language optimization method and an electronic apparatus, which may make a generated natural language sentence without an information gap.

One of exemplary embodiments provides a graph-based natural language optimization method, adapted for an electronic apparatus with a processor. The method includes the following steps. An input sentence submitted by a user is received via a data extraction apparatus. Multiple domain-related entities are extracted from the input sentence. The domain-related entities are input to a graph database to analyze a connection relationship between the domain-related entities, and filling data is obtained from the graph database based on the connection relationship. The input sentence and the filling data are integrated via a natural language processing technology to generate an optimized natural language sentence.

One of exemplary embodiments further provides an electronic apparatus, including a data extraction apparatus, a storage apparatus, and a processor. The data extraction apparatus is configured to receive an input sentence submitted by a user. The storage apparatus stores one or more instructions and a graph database. The processor is coupled to the data extraction apparatus and the storage apparatus. In addition, the processor is configured to execute the instruction for the following operations. Multiple domain-related entities are extracted from the input sentence. The domain-related entities are input to the graph database to analyze a connection relationship between the domain-related entities, and filling data is obtained from the graph database based on the connection relationship. The input sentence and the filling data are integrated via a natural language processing technology to generate an optimized natural language sentence.

Based on the above, the graph-based natural language optimization method and the electronic apparatus provided by the exemplary embodiments of the disclosure may fill the information gap in the input sentence and optimize the input sentence including the complete information for the information gap in a natural language sentence. Therefore, the disclosure may make the generated natural language sentence without an information gap, thereby improving information completeness and understandability of an input sentence.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF THE EMBODIMENTS

Figure 1:
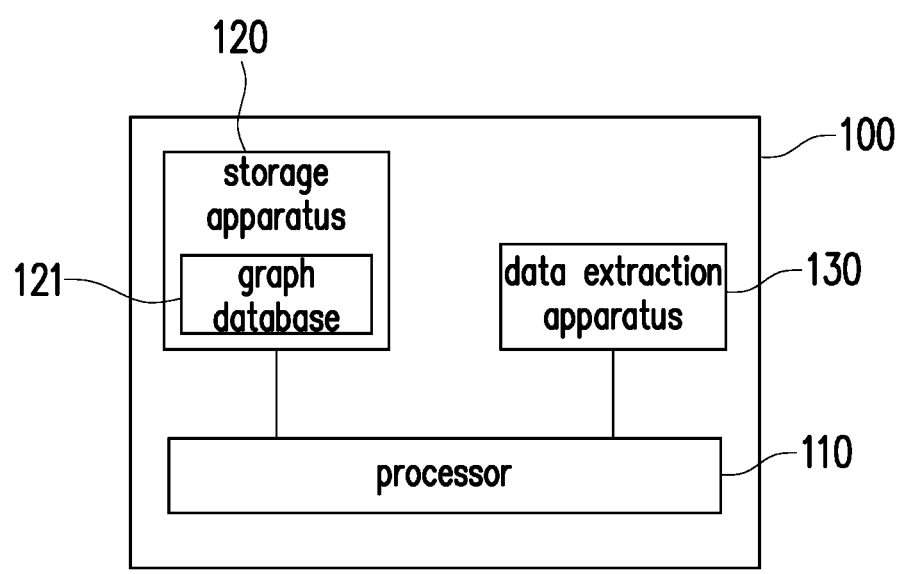
FIG. 1 is a block diagram of an electronic apparatus according to an embodiment of the disclosure.

FIG. 1 is a block diagram of an electronic apparatus according to an embodiment of the disclosure. With reference to FIG. 1, an electronic apparatus 100 includes a processor 110, a storage apparatus 120, and a data extraction apparatus 130. The processor 110 is coupled to the storage apparatus 120 and the data extraction apparatus 130 and may access and execute an instruction recorded in the storage apparatus 120 to implement the graph-based natural language optimization method in the embodiments of the disclosure. The electronic apparatus 100 may be any interactive apparatus that needs to generate a natural sentence with low cognitive load, which is, for example but not limited to, a VR, AR, or MR head-mounted apparatus, a wearable apparatus, a personal computer, a server, a mobile apparatus, or the like.

In different embodiments, the processor 110 is, for example but not limited to, a central processing unit (CPU) or other programmable general-purpose or special-purpose microprocessor, a digital signal processor (DSP), a programmable controller, an application specific integrated circuit (ASIC), a programmable logic device (PLD), other similar apparatuses, or a combination of these apparatuses.

The storage apparatus 120 is, for example, any type of fixed or mobile random access memory (RAM), read-only memory (ROM), flash memory, hard disk, other similar apparatuses, or a combination of these apparatuses, for storing one or more instructions that may be executed by the processor 110 and may be loaded in the processor 110. In this embodiment, the storage apparatus 120 stores a graph database 121. The graph database 121 stores multiple triple data in a semantic triple format, and the triple data in the triple format is, for example, <first entity, relationship information, second entity>.

The graph database 121 may store a knowledge graph (KG) established based on the triple data in the triple format. The knowledge graph may include multiple nodes corresponding to one or more entities and an edge corresponding to relationship information between entities. The knowledge graph may present whether each node among multiple nodes is associated with each other and present the relationship information corresponding to the edges between each node. In this embodiment, the processor 110 may receive multiple operating information provided by experts, generate the triple data based on the operating information, and establish the knowledge graph according to the triple data. The operating information is, for example, an operating instruction for operating a system, a machine, a product, or performing an experiment, such as: "blow the J-liner with the inert gases", "pull the glove over the O-ring", or other operating instructions.

Figure 2:
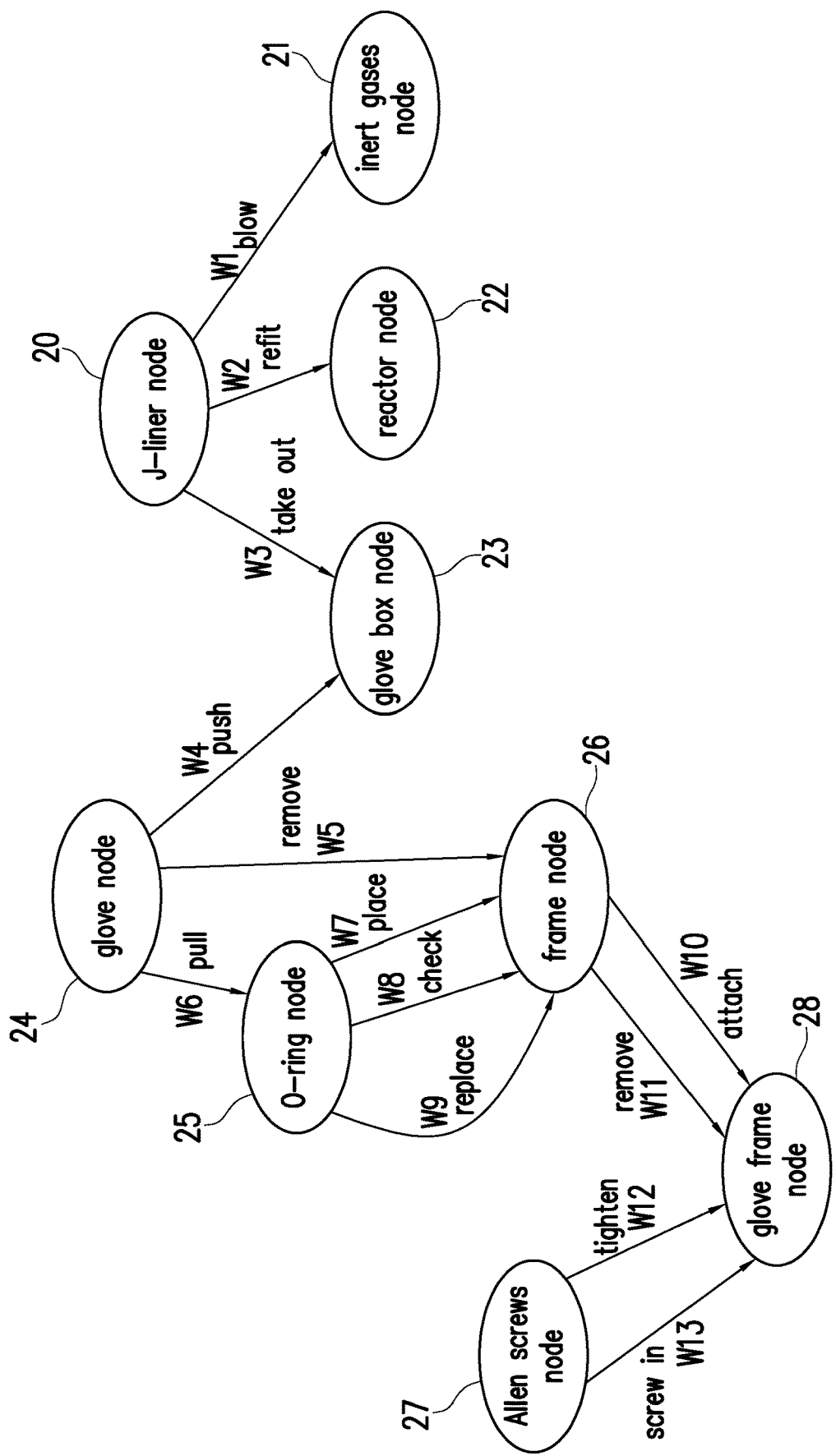
FIG. 2 is a schematic diagram of a knowledge graph according to an embodiment of the disclosure.

FIG. 2 is a schematic diagram of a knowledge graph according to an embodiment of the disclosure. Taking the industrial maintenance field as an example, the operating information may include a first entity (at least one of a component or material name, an operating position, a specification condition, and other information), a method of operation (the relationship information), and a second entity (at least one of a component or material name, an operating position, a specification condition, and other information). For example, the operating information "blow the J-liner with the inert gases" includes the component or material name "J-liner", the method of operation "blow", and the component or material name "inert gases". After obtaining the operating information, the processor 110 may convert the operating information into triple data, such as <J-liner (component or material name), blow (method of operation), inert gases (component or material name)>. Next, the processor 110 may establish a node related to the component or material name and the operating position on the knowledge graph according to the component or material name and the operating position. The established node is, for example, a J-liner node 20, an inert gases node 21, a reactor node 22, a glove box node 23, a glove node 24, an O-ring node 25, a frame node 26, an Allen screws node 27, and a glove frame node 28 in a knowledge graph 2 shown in FIG. 2.

The processor 110 may further find another node associated with a node from the knowledge graph, thereby establishing edges between each node according to the operating information. The established edges, for example, correspond to relationship information such as "blow", "refit", "take out", "push", "remove", "pull", "place", "check", "replace", "attach", "tighten", and "screw in" in the knowledge graph 2 shown in FIG. 2. For example, the processor 110 may establish the edge between the J-liner node 20 and the inert gases node 21 in the knowledge graph 2 according to the triple data <J-liner, blow, inert gases> of the operating information "blow the J-liner with inert gases" associated with the J-liner node 20. Moreover, this edge is associated with the method of operation "blow", which means the J-liner node 20 and the inert gases node 21 have the relationship information corresponding to the method of operation "blow". Other nodes and edges in the knowledge graph 2 shown in FIG. 2 are established in the same way, and details are not described herein.

It should be noted that the graph database 121 records an entity corresponding to a node and an attribute of relationship information corresponding to an edge. For example, the "component or material name" corresponds to the attribute of the first entity "J-liner" of the J-liner node 20, the "method of operation" corresponds to the attribute of the relationship information "blow" between the J-liner node 20 and the inert gases node 21, and the "component or material name" corresponds to the attribute of the second entity "inert gases" of the inert gases node 21.

In addition, the processor 110 may use multiple operating information to train the knowledge graph, and may train weights corresponding to edges between each node according to the relationship information in the triple data. With reference to FIG. 2, weights W1 to W13 are illustrated in the knowledge graph 2. For example, the processor 110 may set the weight W1 according to the number of interactions between "J-liner", "blow", and "inert gases" in multiple operating information. This weight is, for example but not limited to, a cumulative number of interactions or the like.

In this embodiment, the data extraction apparatus 130 is for receiving an input sentence submitted by a user. The input sentence is, for example, text data or voice signals that record operating instructions of a system, a machine, a product, or an experiment. Specifically, the data extraction apparatus 130 may be any input apparatus receiving an input sentence submitted by a user in a wired or wireless manner, such as a keyboard, a screen, a microphone, or the like. Alternatively, the data extraction apparatus 130 may also be any receiver that supports wired or wireless reception of an input sentence submitted by a user, such as a receiver compatible with one or a combination of Wireless Fidelity (WiFi) system, Worldwide Interoperability for Microwave Access (WiMAX) system, the third-generation wireless communication technology (3G), the fourth-generation wireless communication technology (4G), the fifth-generation wireless communication technology (5G), long term evolution (LTE) technology, infrared transmission, and Bluetooth (BT) communication technology, but the disclosure is not limited thereto.

Figure 3:
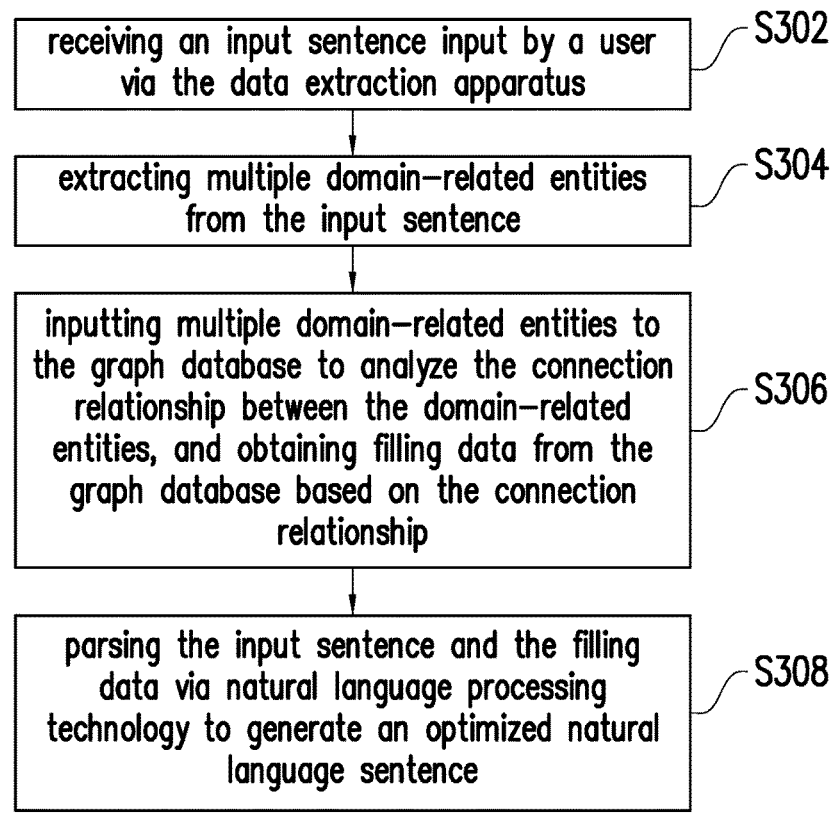
FIG. 3 is a flow chart of a graph-based natural language optimization method according to an embodiment of the disclosure.

FIG. 3 is a flow chart of a graph-based natural language optimization method according to an embodiment of the disclosure. With reference to FIG. 1 and FIG. 3 together, the method of this embodiment is adapted for the electronic apparatus 100. Detailed steps of the graph-based natural language optimization method of this embodiment are explained as follows with reference to description of apparatuses and elements of the electronic apparatus 100.

First, in step S302, the processor 110 receives an input sentence submitted by a user via the data extraction apparatus 130. The input sentence is, for example, text data or voice signals input by the user. In an embodiment, if the user inputs a sentence by voice, after receiving voice signals, the processor 110 first performs voice recognition on the voice signals to convert the voice signals into a text input sentence. The disclosure does not limit the voice recognition method herein.

Next, in step S304, the processor 110 extracts multiple domain-related entities from the input sentence. The processor 110 performs entity extraction operation on the input sentence to extract multiple domain-related entities from the input sentence. Specifically, the entity extraction operation includes, but is not limited to, thesaurus comparison method, grammar analysis method, and statistical analysis method. Specifically, the thesaurus comparison method uses an established thesaurus to compare and extract phrases in an input sentence as domain-related entities; the grammar analysis method parses phrases in an input sentence via natural language processing technology and filters out unsuitable words with inference methods and criteria to extracts suitable words as domain-related entities; the statistical analysis method analyzes the content of an input sentence and accumulates sufficient statistical parameters before extracting phrases matching the statistical parameters as domain-related entities. The statistical parameter is, for example, a frequency of occurrence of words (i.e., word frequency), taking out words whose word frequencies appear a certain range as domain-related entities.

For example, assuming that the input sentence is "blow the J-liner", the processor 110 may extract the domain-related entities "blow" and "J-liner" from the input sentence. Assuming the input sentence is "pull it over the O-ring", the processor 110 may extract the domain-related entities "pull" and "O-ring" from the input sentence.

Next, in step S306, the processor 110 inputs multiple domain-related entities to the graph database 121 to analyze a connection relationship between the domain-related entities, and obtains filling data from the graph database 121 based on the connection relationship. In an embodiment, the graph database 121 includes a knowledge graph established by the processor 110 according to multiple triple data. The processor 110 may input multiple domain-related entity to the knowledge graphs for querying to determine whether these domain-related entities have a connection relationship. For example, the processor 110 may execute a path search algorithm based on the knowledge graph to determine whether these domain-related entities have a connection relationship. The path search algorithm is, for example but not limited to, path ranking, random walk, or the like. For example, the path ranking algorithm may be represented by the following mathematical expression:

$$\text{score}(s,t) = \Sigma_{P \in P} \text{Prob}(s \to t; P) \theta_P$$

Among the above, score(s,t) represents a value of moving from node s to node t calculated via the path ranking algorithm, P∈P represents a path P belongs to all available paths P for moving from node s to node t, Prob(s→t; P) represents a probability of moving from node s to node t through the path P, and $\theta_P$ represents a weight of moving through the path P (trained and generated by machine learning algorithm).

In response to determining that the domain-related entities have a connection relationship, the processor 110 may obtain filling data from the graph database 121 based on the connection relationship. In addition, in response to determining that the domain-related entities have no connection relationship, the processor 110 may directly output the input sentence. In other words, when the processor 110 determines that the domain-related entities in the input sentence have a connection relationship, it may indicate that the input sentence includes an information gap, and the filling data is thus required to fill the information gap in the input sentence. The triple data for establishing the knowledge graph includes the first entity, the relationship information, and the second entity. In this embodiment, determining that the domain-related entities have a connection relationship, the processor 110 may obtain at least one of the first entity, the relationship information, and the second entity indicated by the connection relationship to be associated with the domain-related entities from the knowledge graph as the filling data.

For example, it is assumed that the processor 110 extracts the domain-related entities "blow" and "J-liner" from the input sentence "blow the J-liner". With reference to FIG. 2, the processor 110 may input the domain-related entities "blow" and "J-liner" to the knowledge graph 2 for querying. In this embodiment, the processor 110 may determine that the domain-related entities "blow" and "J-liner" have a connection relationship based on the edge associated with "blow" and the J-liner node 20 associated with "J-liner". At this time, the processor 110 may obtain the second entity "inert gases" corresponding to the inert gases node 21 indicated by the connection relationship to be associated with the domain-related entities "blow" and "J-liner" as the filling data.

In an embodiment, between the domain-related entities may be multiple connection relationships. In this embodiment, the processor 110 may calculate a feature value between multiple domain-related entities according to a weight corresponding to an edge associated with the domain-related entities, and may determine at least one of the first entity, the relationship information, and the second entity associated with the domain-related entities as the filling data based on this feature value. Specifically, the processor 110 may execute a path search algorithm such as path ranking or random walk based on the knowledge graph to obtain multiple paths between the domain-related entities, and may calculate the feature value of each path according to the weight corresponding to the edge in the path. Next, the processor 110 may select one of the paths as a candidate path according to the feature value of each path, and may obtain at least one of the first entity, the relationship information, and the second entity indicated by the candidate path to be associated with the domain-related entities as the filling data.

Figure 4:
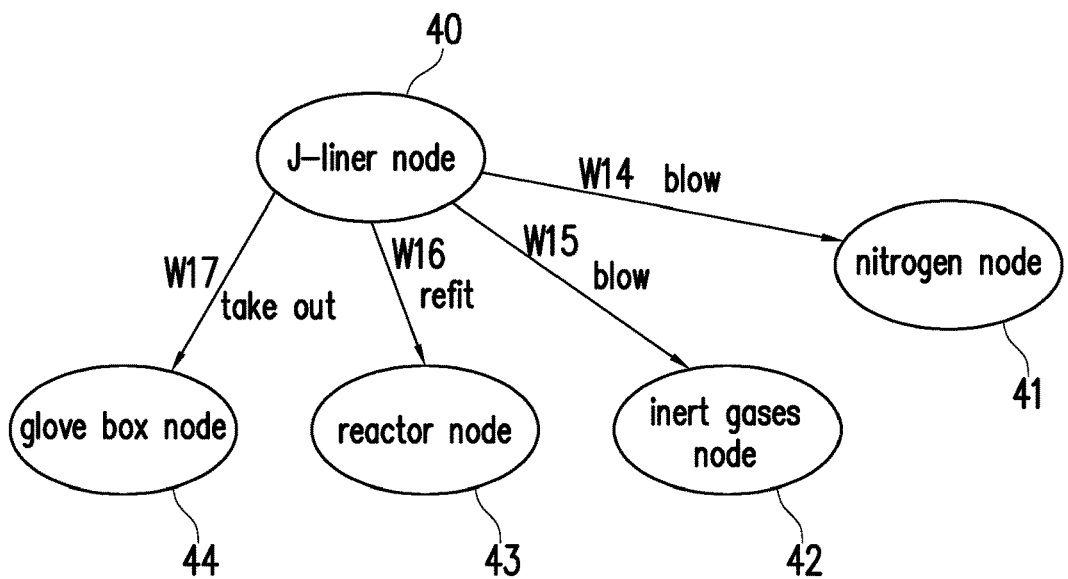
FIG. 4 is a schematic diagram of a knowledge graph according to an embodiment of the disclosure.

FIG. 4 is a schematic diagram of a knowledge graph according to an embodiment of the disclosure. With reference to FIG. 4, the knowledge graph in FIG. 4 includes a J-liner node 40, a nitrogen node 41, an inert gases node 42, a reactor node 43, and a glove box node 44, with edges between each node corresponding to weights W14 to W17. Assuming that the processor 110 extracts the domain-related entities "blow" and "J-liner" from the input sentence "blow the J-liner", the processor 110 may determine that the domain-related entities "blow" and "J-liner" have two connection relationships based on the edge associated with "blow" and the J-liner node 40 associated with "J-liner". In this embodiment, the processor 110 may obtain two paths corresponding to two connection relationships. For example, the first path includes the J-liner node 40 and the edge corresponding to the weight W14, and the second path includes the J-liner node 40 and the edge corresponding to the weight W15. In addition, the processor 110 may calculate the feature value of the first path according to the weight W14 (such as using W14 as the feature value) and calculate the feature value of the second path according to the weight W15 (such as using W15 as the feature value). If it is determined that W14 is greater than W15, the processor 110 may select the first path as the candidate path and obtain the second entity "nitrogen" corresponding to the nitrogen node 41 indicated by the first path as the filling data.

In step S308, the processor 110 parses the input sentence and the filling data via natural language processing technology to generate an optimized natural language sentence.

Specifically, the processor 110 may execute natural language generation (NLG) to generate the optimized natural language sentence based on the input sentence and the filling data. The generated optimized natural language sentence is, for example but not limited to, a short sentence including more than three domain-related entities and less than 140 characters. Regarding natural language generation technology as a well-known technical means to those skilled in the art, natural language generation is a part of natural language processing, transforming a machine representation system such as a knowledge base or a logical form into a natural language that humans may understand. For example, the processor 110 may generate an optimized natural language sentence by combining an input sentence with filling data based on information such as pre-trained language models, part-of-speech tagging (POS), or sentence structures (for example, imperative syntax structures). For example, the input sentence "blow the J-liner" is combined with the filling data "inert gases" to produce the optimized natural language sentence "blow the J-liner with the inert gases)". In this way, the embodiments provided by the disclosure may optimize an operating instruction including an information gap (such as the above embodiment lacking the name of the component used to blow the J-liner) into an operating instruction with low cognitive load having no information gap.

In an embodiment, the electronic apparatus 100 further includes an output apparatus (not illustrated) coupled to the processor 110. This output apparatus is, for example, a display apparatus, a microphone, or other apparatuses. The processor 110 may output the optimized natural language sentence generated in step S308 via the output apparatus, such as displaying the optimized natural language sentence via the display apparatus or playing a voice signal corresponding to the optimized natural language sentence via the microphone. On the other hand, if no connection relationship is determined between the domain-related entities, the processor 110 may directly output the input sentence via the output apparatus.

In summary, the graph-based natural language optimization method and the electronic apparatus provided by embodiments of the disclosure may fill the information gap in the input sentence and optimize the input sentence including the information gap into a natural language sentence with complete information. Based on this, the disclosure may make sure that the generated operating instruction is a natural language sentence without an information gap, thereby improving information completeness and understandability of an input sentence to reduce the information gap between the original document content and user understanding. Accordingly, the operating instructions with low cognitive load generated in the disclosure is adapted to be integrated with an interactive display apparatus, such that users may understand the operating instructions displayed by the apparatus more clearly. In addition, the burden of experts in editing operating manuals may also be reduced, which effectively saves the workload of generating natural language sentences.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A graph-based natural language optimization method, adapted for an electronic apparatus with a processor and comprising:
    receiving an input sentence submitted by a user via a data extraction apparatus;
    extracting a plurality of domain-related entities from the input sentence;
    inputting the plurality of domain-related entities to a graph database to analyze a connection relationship between the plurality of domain-related entities and obtaining filling data from the graph database based on the connection relationship, wherein the graph database stores a knowledge graph based on a plurality of triple data, and the triple data comprise a first entity, relationship information, and a second entity, wherein the knowledge graph comprises a plurality of nodes corresponding to a plurality of the first entities and a plurality of the second entities, and comprises a plurality of edges corresponding to the relationship information; and
    integrating the input sentence and the filling data via a natural language processing technology to generate an optimized natural language sentence;
    wherein a step of obtaining the filling data from the graph database based on the connection relationship comprises:
    calculating a feature value between the plurality of domain-related entities according to a weight corresponding to the edge associated with the plurality of domain-related entities; and
    determining at least one of the first entity, the relationship information, and the second entity associated with the domain-related entity based on the feature value as the filling data.

2. The graph-based natural language optimization method according to claim 1, wherein a step of extracting the plurality of domain-related entities from the input sentence comprises:
    performing entity extraction operation on the input sentence to extract the plurality of domain-related entities from the input sentence.

3. The graph-based natural language optimization method according to claim 1, wherein a step of inputting the plurality of domain-related entities to the graph database to analyze the connection relationship between the plurality of domain-related entities comprises:
    inputting the plurality of domain-related entities to the knowledge graph for querying to determine whether the plurality of domain-related entities have the connection relationship.

4. The graph-based natural language optimization method according to claim 1, wherein a step of obtaining the filling data from the graph database based on the connection relationship comprises:
    obtaining at least one of the first entity, the relationship information, and the second entity indicated by the connection relationship to be associated with the domain-related entity from the knowledge graph as the filling data.

5. The graph-based natural language optimization method according to claim 1, wherein a step of calculating the feature value between the plurality of domain-related entities according to the weight corresponding to the edge associated with the plurality of domain-related entities comprises:

executing a path search algorithm based on the knowledge graph to obtain a plurality of paths between the plurality of domain-related entities, and calculating the feature value of the path according to the weight corresponding to the edge in the path.

6. The graph-based natural language optimization method according to claim 5, wherein a step of determining at least one of the first entity, the relationship information, and the second entity associated with the domain-related entity based on the feature value as the filling data comprises:
selecting one of the plurality of paths as a candidate path according to the feature value, and obtaining at least one of the first entity, the relationship information, and the second entity indicated by the candidate path to be associated with the domain-related entity as the filling data.

7. The graph-based natural language optimization method according to claim 1, wherein the first entity comprises at least one of a component or material name, an operating position, and a specification condition, the relationship information comprises a method of operation, and the second entity comprises at least one of a component or material name, an operating position, and a specification condition.

8. An electronic apparatus, comprising:
a data extraction apparatus, configured to receive an input sentence submitted by a user;
a storage apparatus, storing one or a plurality of instructions and a graph database, wherein the graph database stores a knowledge graph based on a plurality of triple data, and the triple data comprise a first entity, relationship information, and a second entity, wherein the knowledge graph comprises a plurality of nodes corresponding to a plurality of the first entities and a plurality of the second entities, and comprises a plurality of edges corresponding to the relationship information; and
a processor, coupled to the data extraction apparatus and the storage apparatus, the processor configured to execute the instruction to:
extract a plurality of domain-related entities from the input sentence;
input the plurality of domain-related entities to the graph database to analyze a connection relationship between the plurality of domain-related entities and obtain filling data from the graph database based on the connection relationship; and
parse the input sentence and the filling data via a natural language processing technology to generate an optimized natural language sentence;
wherein operation of obtaining the filling data from the graph database based on the connection relationship comprises:
calculating a feature value between the plurality of domain-related entities according to a weight corresponding to the edge associated with the plurality of domain-related entities; and
determining at least one of the first entity, the relationship information, and the second entity associated with the domain-related entity based on the feature value as the filling data.

9. The electronic apparatus according to claim 8, wherein operation of extracting the plurality of domain-related entities from the input sentence comprises:
performing entity extraction operation on the input sentence to extract the plurality of domain-related entities from the input sentence.

10. The electronic apparatus according to claim 8, wherein operation of inputting the plurality of domain-related entities to the graph database to analyze the connection relationship between the plurality of domain-related entities comprises:
inputting the plurality of domain-related entities to the knowledge graph for querying to determine whether the plurality of domain-related entities have the connection relationship.

11. The electronic apparatus according to claim 8, wherein operation of obtaining the filling data from the graph database based on the connection relationship comprises:
obtaining at least one of the first entity, the relationship information, and the second entity indicated by the connection relationship to be associated with the domain-related entity from the knowledge graph as the filling data.

12. The electronic apparatus according to claim 8, wherein operation of calculating the feature value between the plurality of domain-related entities according to the weight corresponding to the edge associated with the plurality of domain-related entities comprises:
executing a path search algorithm based on the knowledge graph to obtain a plurality of paths between the plurality of domain-related entities, and calculating the feature value of the path according to the weight corresponding to the edge in the path.

13. The electronic apparatus according to claim 12, wherein operation of determining at least one of the first entity, the relationship information, and the second entity associated with the domain-related entity based on the feature value as the filling data comprises:
selecting one of the plurality of paths as a candidate path according to the feature value, and obtaining at least one of the first entity, the relationship information, and the second entity indicated by the candidate path to be associated with the domain-related entity as the filling data.

14. The electronic apparatus as according to claim 8, wherein the first entity comprises at least one of a component or material name, an operating position, and a specification condition, the relationship information comprises a method of operation, and the second entity comprises at least one of a component or material name, an operating position, and a specification condition.

* * * * *